3,707,543
DIBUTYL-4-HYDROXYPHENYLBENZOATES OF TRIS(HYDROXYALKYL)ISOCYANURATE
David H. Steinberg, Bronx, and Martin Dexter, Briarcliff Manor, N.Y., assignors to Ciba-Geigy Corporation, Greenburgh, N.Y.
No Drawing. Filed Feb. 25, 1971, Ser. No. 118,968
Int. Cl. C07d 55/38
U.S. Cl. 260—248 NS         6 Claims

ABSTRACT OF THE DISCLOSURE

Esters of tris(hydroxyalkyl)isocyanurates with dibutyl-4-hydroxyphenyl benzoic acids are stabilizers of organic material. The compounds, of which tris[2-(3,5-di-tert.-butyl-4-hydroxybenzoyloxy)ethyl]-isocyanurate is a typical embodiment, are prepared through esterification of tris(2-hydroxyethyl)isocyanurate.

DETAILED DESCRIPTION

The invention described herein pertains to a class of organic triesters which can be diagrammatically depicted by the structural formula:

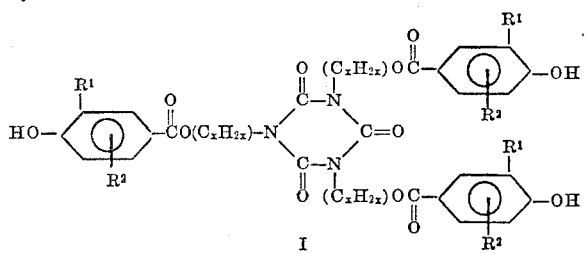

In the compounds depicted by Formula I, each of $R^1$ and $R^2$ is the same or different butyl group, such as n-butyl, sec-butyl or tert-butyl. The preferred group is tert-butyl. The symbol $x$ is an integer from 1 to 6.

These compounds are stabilizers of organic materials which are otherwise subject to thermo-oxidative and/or actinic deterioration. Thus through the incorporation in various substrates of from about 0.005 to about 5% (by weight) of one or more of these compounds, either alone or in combination with other stabilizers such as dilaurylthiodipropionate, distearylthiodipropionate, ultraviolet light absorbers, and the like, there is observed a significant increase in the stability of the substrate. Such substrates include synthetic organic polymeric substances, such as vinyl resins, formed from the polymerization of vinyl halides or from the copolymerization of vinyl halides with unsaturated polymerizable compounds, e.g., vinyl esters, α,β-unsaturated hydrocarbons such as butadienes and styrene; polyolefins such as polyethylene, polypropylene, polybutylene and polyisoprene, including copolymers of olefins with other ethylenically unsaturated comonomers; polyurethanes and polyamides such as polyhexamethylene adipamide and polycaprolactam; polyesters such as polyethylene terephthalates; polycarbonates; polyacetals; polystyrene; polyethyleneoxide; copolymers of the foregoing such as those of high impact polystyrene containing copolymers of butadiene and styrene and those formed by the copolymerization of acrylonitrile, butadiene and/or styrene. Other materials which are stabilized by these triesters include lubricating oil of the aliphatic ester type such as di(2-ethylhexyl)-azelate and pentaerythritol tetracaproate; animal and vegetable derived oils and fats such as linseed oil, animal fat, tallow, lard, peanut oil, cod liver oil, castor oil, palm oil, corn oil and cottonseed oil; and hydrocarbon materials such as gasoline, mineral oil, fuel oil, drying oil, cutting fluids, waxes, resins and fatty acids such as soaps.

These triesters can be prepared through esterification of tris(hydroxyalkyl)isocyanurate with a dialkyl-4-hydroxyphenyl carboxylic acid derivative of the formula:

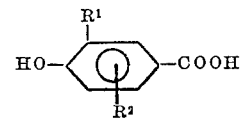

II wherein $R^1$ and $R^2$ are as previously defined. This derivative can be either the free acid, an acid halide thereof such as the acid chloride or acid bromide, or an acid anhydride thereof. When the free acid is employed, the esterification is preferably conducted in an inert non-aqueous organic solvent in the presence of an acid catalyst. An inert non-aqueous organic solvent is also preferably employed when the acid halide or anhydride is utilized, together with an acid acceptor such as dimethylaniline.

Other esterification techniques, such as transesterification with an alkyl ester of the derivatives of Formula II, or utilization of an alkali metal salt of these derivatives with a tris(haloalkyl)isocyanurate in a manner known per se can also be employed. Thus, for example, the methyl ester of the acid depicted by Formula II and tris(hydroxyalkyl)isocyanurate are heated in the presence of a catalyst such as sodium methoxide or dibutyltin oxide with removal of the methanol thus formed.

Alternatively a tris(alkali metal)cyanurate or isocyanurate can be reacted with a haloalkyl ester of the derivative of Formula II, analogously to the procedure described in U.S. Pat. No. 3,249,607 to Taub et al.

The product obtained according to these procedures can be purified to the degree desired through conventional techniques such as recrystallization or chromatography.

The following examples will serve to further illustrate the nature of the present invention.

EXAMPLE 1

Tris[2-(3,5-di-t-butyl-4-hydroxybenzoyloxy) ethyl]isocyanurate

A solution consisting of 10.45 g. (0.040 mole) of tris(2-hydroxyethyl)isocyanurate, 18.18 g. (0.15 mole) dimethyl aniline and 250 ml. toluene is stirred under nitrogen at room temperature. To this is added in a dropwise fashion, a solution of 45.7 g. (0.17 mole) of 3,5-di-tert.butyl-4-hydroxybenzoyl chloride in 250 ml. of toluene over an interval of 2.5 hours. The resulting mixture is then stirred and heated at 90° for an additional three hours. After cooling, the mixture is filtered and the filtrate washed successively with water, 1 N hydrochloric acid, water, 2 N sodium hydroxide, water and saturated sodium chloride solution. The washed solution is dried over molecular sieves. Filtration, followed by removal of the solvent yields 29.9 g. of product which is crystallized from heptane-toluene and recrystallized from heptane-cyclohexane. The product is a white crystalline solid having a melting point of 169–172° C.

EXAMPLE 2

Tris[(3,5-di-t-butyl-4-hydroxybenzoyloxy) methyl]isocyanurate

One mole of tris(hydroxymethyl)isocyanurate is reacted with 3 moles of 3,5-di-t-butyl-4-hydroxybenzoyl chloride in benzene in the presence of 3 moles of dry pyridine. The reaction mixture is then filtered and the solvent stripped under reduced pressure to afford the above-named product.

The preparation of tris(hydroxymethyl)isocyanurate is disclosed in Pazenko et al., Ukr. Khim, Zh. vol. 30(2), 195–8 (1964), Chem. Abst. 61, 1866d (1964).

EXAMPLE 3

Tris[6-(3,5-di-t-butyl-4-hydroxybenzoyloxy) hexyl]isocyanurate

A mixture of 19.4 g. of trisodium cyanurate, 409.5 g. of 6-chloro-1-hexanol acetate and 600 g. of dimethylacetamide are heated for about 20 hours at about 125° C. Then the reaction mixture is cooled to 50° C. and filtered. After the purification, tris-(4-acetoxyhexyl)isocyanurate is obtained.

The intermediate prepared above is hydrolyzed by sodium hydroxide in aqueous methanol to give tris(4-hydroxyhexyl)isocyanurate. This product is then reacted with 3,5-di-t-butyl-4-hydroxybenzoyl chloride according to the procedure of Example 2 yielding the above named product.

EXAMPLE 4

Tris[2-(3,5-di-t-butyl-4-hydroxybenzoyloxy) propyl]isocyanurate

A mixture of 19.4 g. of trisodium cyanurate, 39.1 g. of 1-chloro-2-propanol acetate and 600 g. of dimethylacetamide is reacted according to the procedure of Example 3. The intermediate product obtained is tris(2-hydroxypropyl)isocyanurate. This material is reacted with 3,5-di-t-butyl-4-hydroxybenzoyl chloride according to Example 1 yielding tris[2 - (3,5-di-t-butyl - 4 - hydroxybenzoyloxy) propyl]isocyanurate.

When the above procedure is repeated employing 3,6-di-t-butyl - 4 - hydroxybenzoyl chloride, tris[2 - (3,6-di-t-butyl-4-hydroxybenzoyloxy)propyl]isocyanurate is obtained.

Although the compounds of this invention are useful as antioxidants as noted above, their most important utility is as light stabilizers of organic polymers, especially polyolefins such as polypropylene.

What is claimed is:
1. A compound of the formula

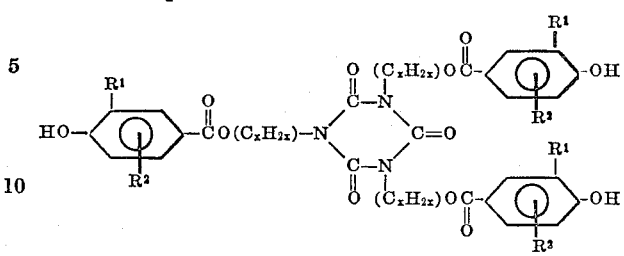

wherein $R^1$ and $R^2$ is independently a butyl group, and $x$ is an integer from 1 to 6.

2. A compound according to claim 1 wherein $R^1$ and $R^2$ are tert-butyl groups in ortho positions to the hydroxyl groups.

3. The compound according to claim 2 which is tris[2-(3,5-di-t-butyl-4-hydroxybenzoyloxy)ethyl]isocyanurate.

4. The compound according to claim 2 which is tris[(3,5-di-t-butyl - 4 - hydroxybenzoyloxy)methyl]isocyanurate.

5. The compound according to claim 2 which is tris[6-(3,5-di-t-butyl-4-hydroxybenzoyloxy)hexyl]isocyanurate.

6. The compound according to claim 2 which is tris[2-(3,5 - di - t - butyl - 4 - hydroxybenzoyloxy)propyl]isocyanurate.

References Cited

UNITED STATES PATENTS

| | | | |
|---|---|---|---|
| 3,567,724 | 3/1971 | Beears | 260—248 |
| 3,598,815 | 8/1971 | Gilles | 260—248 |

JOHN M. FORD, Primary Examiner

U.S. Cl. X.R.

99—163; 252—51.5 R, 403; 260—45.8 N